(12) United States Patent
Wang (10) Patent No.: US 12,164,333 B2
(45) Date of Patent: Dec. 10, 2024

(54) SUPPORT MEMBER AND FOLDABLE DISPLAY DEVICE

(71) Applicant: Wuhan China Star Optoelectronics Semiconductor Display Technology Co., Ltd., Hubei (CN)

(72) Inventor: Wenqiang Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/772,165

(22) PCT Filed: Apr. 18, 2022

(86) PCT No.: PCT/CN2022/087352
§ 371 (c)(1),
(2) Date: Apr. 27, 2022

(87) PCT Pub. No.: WO2023/184607
PCT Pub. Date: Oct. 5, 2023

(65) Prior Publication Data
US 2024/0143032 A1    May 2, 2024

(30) Foreign Application Priority Data

Apr. 1, 2022  (CN) .......................... 202210356911.2

(51) Int. Cl.
*G06F 1/16* (2006.01)
*G09F 9/30* (2006.01)
(52) U.S. Cl.
CPC .......... *G06F 1/1641* (2013.01); *G06F 1/1652* (2013.01); *G09F 9/301* (2013.01)

(58) Field of Classification Search
CPC ....... G06F 1/1641; G06F 1/1652; G09F 9/301
See application file for complete search history.

(56) References Cited

U.S. PATENT DOCUMENTS 11,662,780 B2 *  5/2023  Park ..................... G06F 1/1616
                                                    361/679.01
11,792,945 B2 * 10/2023  Yao ..................... H04M 1/0235
                                                    361/749
(Continued)

FOREIGN PATENT DOCUMENTS

CN          104299524          1/2015
CN          110767098          2/2020
(Continued)

OTHER PUBLICATIONS

International Search Report and the Written Opinion Dated Dec. 20, 2022 From the International Searching Authority Re. Application No. PCT/CN2022/087352 and Its Translation Into English. (21 Pages).

(Continued)

*Primary Examiner* — Rockshana D Chowdhury (57) ABSTRACT

The present application provides a support member and a foldable display device. The support member includes a first foldable area. When the support member is in a flat unfolded state, the support member includes first grooves in the first foldable area. Two opposite ends of the first groove are indented inwardly in a first direction. The first direction intersects a length direction of the support member.

20 Claims, 5 Drawing Sheets

(56) References Cited

U.S. PATENT DOCUMENTS

| | | | | |
|---|---|---|---|---|
| 11,793,061 | B2* | 10/2023 | Cai | H05K 5/0217 |
| | | | | 361/807 |
| 11,799,993 | B2* | 10/2023 | Zhu | H04M 1/0247 |
| 11,810,482 | B2* | 11/2023 | Wu | G06F 1/1652 |
| 11,842,659 | B2* | 12/2023 | Khachatryan | G06F 1/1652 |
| 11,868,176 | B2* | 1/2024 | Shin | G06F 1/1616 |
| 11,868,184 | B2* | 1/2024 | Tao | G06F 1/1637 |
| 11,877,466 | B2* | 1/2024 | Kang | B32B 15/18 |
| 11,907,019 | B2* | 2/2024 | Soh | G06F 1/1652 |
| 2013/0216740 | A1* | 8/2013 | Russell-Clarke | B21D 31/04 |
| | | | | 219/121.72 |
| 2014/0226275 | A1* | 8/2014 | Ko | G06F 1/1601 |
| | | | | 361/679.27 |
| 2016/0120022 | A1* | 4/2016 | Lee | H04M 1/0268 |
| | | | | 361/749 |
| 2017/0006725 | A1 | 1/2017 | Ahn et al. | |
| 2018/0033830 | A1* | 2/2018 | Kim | H10K 59/873 |
| 2019/0132987 | A1* | 5/2019 | Koo | H05K 7/18 |
| 2019/0141843 | A1* | 5/2019 | Park | H05K 1/189 |
| 2020/0103741 | A1* | 4/2020 | Song | H04N 9/3173 |
| 2022/0192041 | A1* | 6/2022 | Jeon | H05K 5/0226 |

FOREIGN PATENT DOCUMENTS

| | | |
|---|---|---|
| CN | 112150926 | 12/2020 |
| CN | 112164318 | 1/2021 |
| CN | 112700719 | 4/2021 |
| CN | 113470526 | 10/2021 |
| CN | 113793552 | 12/2021 |
| CN | 113808483 | 12/2021 |
| CN | 114023196 | 2/2022 |
| CN | 114203032 | 3/2022 |
| CN | 216010146 | 3/2022 |

OTHER PUBLICATIONS

Notification of Office Action and Search Report Dated Apr. 25, 2023 From The State Intellectual Property Office of the People's Republic of China Re. Application No. 202210356911.2 and Its Translation Into English. (19 Pages).

\* cited by examiner

SUPPORT MEMBER AND FOLDABLE DISPLAY DEVICE

RELATED APPLICATIONS

This application is a National Phase of PCT Patent Application No. PCT/CN2022/087352 having International filing date of Apr. 18, 2022, which claims the benefit of priority of Chinese Patent Application No. 202210356911.2 filed on Apr. 1, 2022. The contents of the above applications are all incorporated by reference as if fully set forth herein in their entirety.

FIELD AND BACKGROUND OF THE INVENTION

The present application relates to a field of display technology and in particular, to a support member and a foldable display device.

Foldable display devices have advantages of being thin and light, portable, and capable of achieving large-sized and small-sized displays. However, the foldable display devices are prone to having lifting/protruding portions when folded.

Therefore, it is necessary to provide a technical solution to solve the problem that the foldable display devices are prone to having lifting/protruding portions when folded.

SUMMARY OF THE INVENTION

It is an objective of the present application to provide a support member and a foldable display device, so as to solve a problem that the foldable display device is prone to having lifting/protruding portions when folded.

A support member for a foldable display device is provided, wherein the support member includes a first foldable area, and when the support member is in a flat unfolded state, the support member includes:

a plurality of first grooves defined in the first foldable area, wherein two opposite ends of each of the first grooves are indented inwardly along a first direction, and the first direction intersects a length direction of the support member.

In the support member, each of the first grooves includes:

two recessed sections disposed opposite to each other in the first direction, wherein each of the recessed sections includes a first end and a second end opposite to each other; and two connecting sections, wherein one connecting section is connected between the first ends of the two recessed sections, and the other connecting section is connected between the second ends of the two recessed sections.

In the support member, each of the recessed sections includes:

a first recessed section; and a second recessed section connected to the first recessed section, wherein the second recessed section and the first recessed section are symmetrically arranged with respect to each other.

In the support member, the first recessed section and the second recessed section are both linear-shaped.

In the support member, an included angle between the first recessed section and the second recessed section is greater than or equal to 20 degrees and less than or equal to 90 degrees.

According to the support member, in each of the first grooves, the connecting sections are linear-shaped and parallel to the first direction, one of the connecting sections is connected to the first recessed sections of the two recessed sections, and the other one of the connecting sections is connected to the second recessed section of the two recessed sections.

According to the support member, in each of the first grooves, an included angle between one of the connecting sections and any first recessed section, and an included angle between the other one of the connecting sections and any second recessed section are both greater than or equal to 15 degrees and less than or equal to 30 degrees.

According to the support member, in each of the first grooves, the two recessed sections are arranged symmetrically with respect to each other, and the two connecting sections are arranged axially symmetrically with respect to each other.

In the support member, an included angle between the first direction and the length direction of the support member is greater than or equal to 30 degrees and less than or equal to 90 degrees.

In the support member, the included angle between the first direction and the length direction of the support member is greater than or equal to 60 degrees and less than or equal to 90 degrees.

In the support member, the included angle between the first direction and the length direction of the support member is equal to 90 degrees.

In the support member, a dimension of the first groove in the first direction is greater than or equal to a dimension of the first groove in the length direction of the support member.

In the support member, a ratio of the dimension of the first groove in the first direction to the dimension of the first groove in the length direction of the support member is greater than or equal to 1 and less than or equal to 4.

In the support member, the first grooves include a plurality of rows of the first grooves arranged in the first direction, and one row of the first grooves includes multiple first grooves arranged side by side along the length direction of the support member.

In the support member, a distance between two adjacent first grooves in one row of the first grooves is smaller than a dimension of each of the first grooves in the length direction of the support member.

In the support member, a ratio of the dimension of the first groove in the length direction of the support member to the distance between two adjacent first grooves in one row of the first grooves is greater than or equal to 3 and less than or equal to 20.

In the support member, each two adjacent first grooves between two adjacent rows of the first grooves are staggered with respect to each other.

In the support member, a portion between adjacent two first grooves in one of the two adjacent rows of the first grooves is connected to a middle of the recessed section of one of the first grooves in the other one of the two adjacent rows of the first grooves.

In the support member, a distance between two adjacent first grooves between two adjacent rows of the first grooves is equal to a distance between two adjacent first grooves in one row of the first grooves.

In the support member, a depth of at least one of the first grooves in a thickness direction of the support member is less than a thickness of the support member, and/or a depth of each of the first grooves in the thickness direction of the support member is equal to the thickness of the support member.

In the support member, a depth of each of the first grooves in a thickness direction of the support member is equal to a thickness of the support member.

In the support member, the support member further includes a second foldable area spaced apart from the first foldable area, the first foldable area is arranged corresponding to an outer foldable area of the foldable display device, and the second foldable area is arranged corresponding to an inner foldable area of the foldable display device, wherein when the support member is in a flat unfolded state, the support member further includes:

a plurality of second grooves defined in the second foldable area, wherein the second grooves are elongated-shaped, and a length direction of each of the second grooves is parallel to the first direction.

In the support member, two opposite ends of each of the second grooves protrude outward in the first direction.

In the support member, the two protruding opposite ends of the second grooves in the first direction include at least one of a circular arc shape or an elliptical arc shape.

In the support member, the first direction is perpendicular to the length direction of the support member, the second grooves include a plurality of columns of the second grooves arranged along the length direction of the support member, and each column of the second grooves include multiple second grooves arranged side by side along the first direction.

In the support member, two adjacent second grooves between two adjacent columns of the second grooves are staggered with respect to each other.

In the support member, the first foldable area is arranged corresponding to an outer foldable area of the foldable display device, and the second foldable area is arranged corresponding to an inner foldable area of the foldable display device.

In the support member, an area ratio of the second grooves in the second foldable area is smaller than an area ratio of the first grooves in the first foldable area.

A foldable display device is provided, wherein the foldable display device includes:

a flexible display panel; and the support member mentioned above, wherein the support member is disposed on a back of a light-emitting surface of the flexible display panel.

Advantages of the Present Application

The present application provides a support member and a foldable display device. The support member includes a first foldable area. When the support member is in a flat unfolded state, the support member includes first grooves disposed in the first foldable area. Two opposite ends of the first groove in the first direction are indented inwardly, and the first direction intersects a length direction of the support member. When a portion of the foldable display device corresponding to the first foldable area is folded outward, the indented ends of each first groove in the first foldable area are compressed under compressive stress, which enables the first groove to adapt to a compressive stress environment of the foldable display device subject to outward folding, and preventing a problem of lifting/protruding of the support member in a thickness direction of the foldable display device.

DESCRIPTION OF SPECIFIC EMBODIMENTS OF THE INVENTION

The present application will be clearly and completely described below with reference to the accompanying drawings and in conjunction with specific embodiments. Obviously, the described embodiments are only some of the embodiments of the present application, but not all of the embodiments. Based on the embodiments in the present application, all other embodiments obtained by those skilled in the art without creative work shall fall within the protection scope of the present application.

Figure 1:
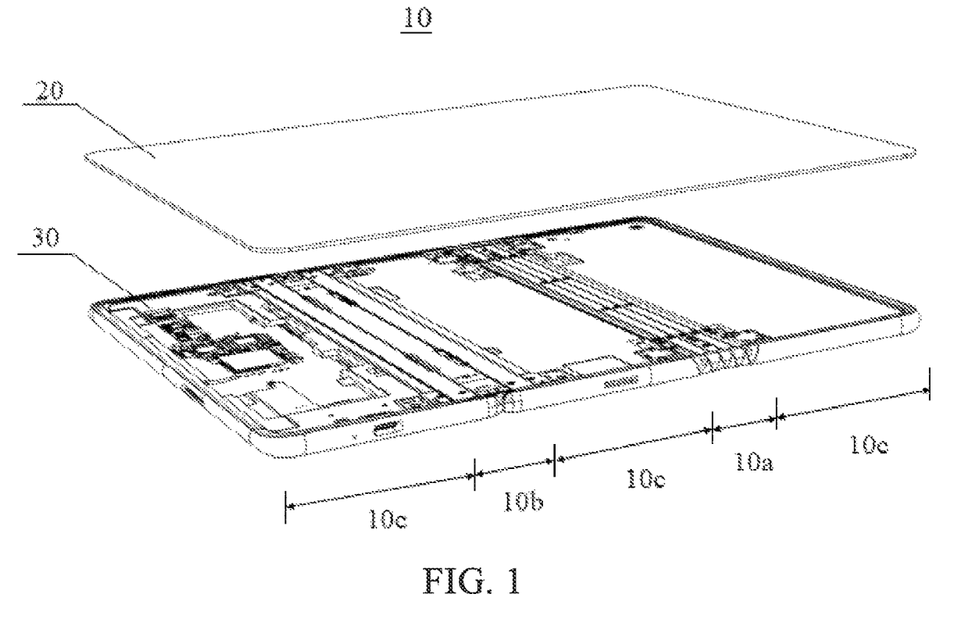
FIG. 1 is an exploded schematic view illustrating a foldable display device when the foldable display device is in a flat unfolded state according to one embodiment of the present application.
Figure 2:
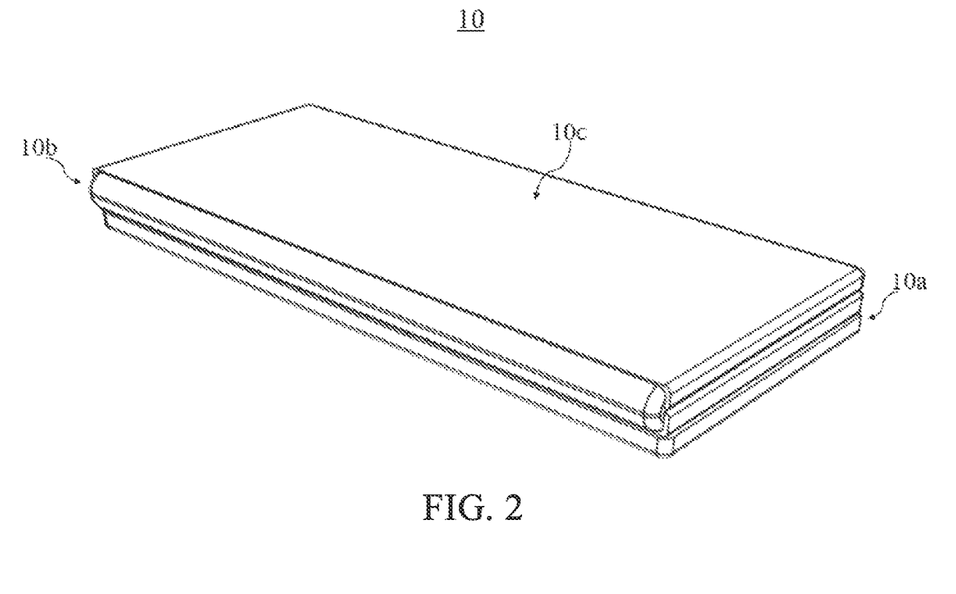
FIG. 2 is a schematic perspective view of the foldable display device in a folded state according to one embodiment of the present application.

Referring to FIGS. 1 and 2, the present application provides a foldable display device 10. The foldable display device 10 includes an outer foldable area 10a, an inner foldable area 10b, and three first non-foldable areas 10c. The three non-foldable areas 10c have a same size, and the three first non-foldable areas 10c are respectively located between an outer foldable area 10a and an inner foldable area 10b, at one side of the outer foldable area 10a away from the inner foldable area 10b, and at one side of the inner foldable area 10b away from the outer foldable area 10a.

As shown in FIG. 2, the foldable display device 10 is folded into a Z-shaped folded device, wherein the outer foldable area 10a of the foldable display device 10 is folded into a U-shape, and the inner foldable area 10b of the foldable display device 10 is folded into a water drop shape. It can be understood that the inner foldable area 10b of the foldable display device 10 can also be folded into a wedge shape.

The foldable display device 10 includes a flexible display module 20 and a flexible mechanism 30, and the flexible display module 20 is disposed on the flexible mechanism 30.

Figure 3:
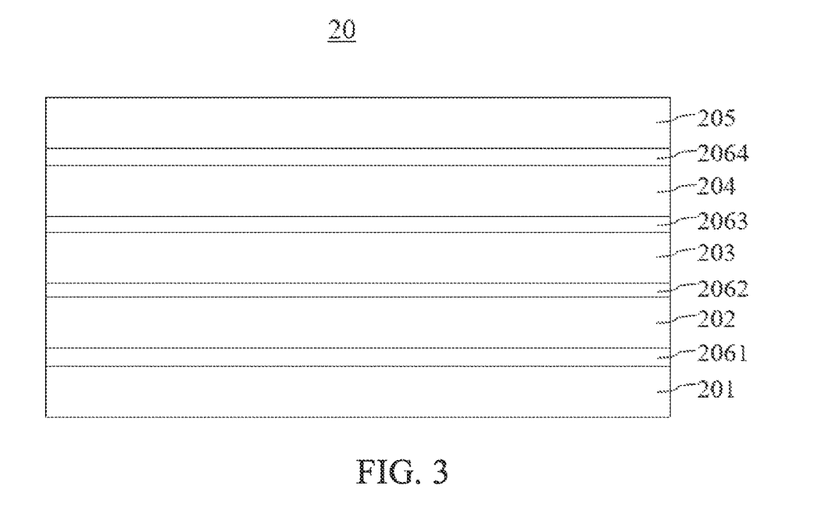
FIG. 3 is a schematic cross-sectional view of a flexible display module when the foldable display device shown in FIG. 1 is in the flat unfolded state.

As shown in FIG. 3, the flexible display module 20 includes a support member 201, a buffer member 202, a flexible display panel 203, a polarizer 204, and a protective cover 205 that are stacked in sequence. The support member 201 and the buffer member 202 are connected by a first adhesive layer 2061, the buffer member 202 and the flexible display panel 203 are connected by a second adhesive layer 2062, the flexible display panel 203 and the polarizer 204 are connected by a third adhesive layer 2063, and the polarizer 204 and the protective cover 205 are connected by a fourth adhesive layer 2064.

The flexible mechanism 30 includes an outward folding mechanism and an inward folding mechanism. Both the outward folding mechanism and the inward folding mechanism adopt conventional designs in the prior art, which are not described in detail in the present application. The flexible mechanism 30 is accommodated in a housing.

Figure 4:
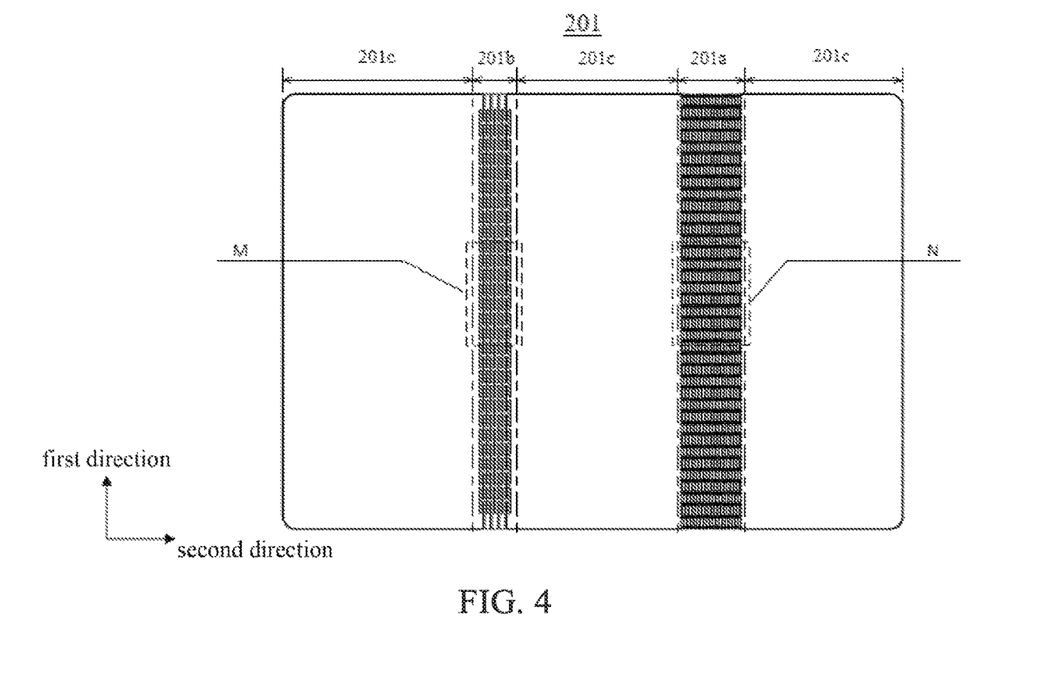
FIG. 4 is a schematic plan view of a support member when the flexible display module shown in FIG. 3 is in the flat unfolded state.

The support member 201 is disposed at a back of a light-emitting surface of the flexible display panel 203. As shown in FIG. 4, the support member 201 includes a first foldable area 201a, a second foldable area 201b, and three second non-foldable areas 201c. The first foldable area 201a, the second foldable area 201b, and the three third non-foldable areas 201c are arranged side by side in a length direction of the support member 201. The three second non-foldable areas 201c have a same size, and the length direction of the support member 201 is a second direction.

The first foldable area 201a and the second foldable area 201b are spaced apart from each other. The three second non-foldable areas 201c are respectively located between the first foldable area 201a and the second foldable area 201b, at one side of the first foldable area 201a away from the second foldable area 201b, and at one side of the second foldable area 201b away from the first foldable area 201a. The first foldable area 201a is arranged corresponding to the outer foldable area 10a, the second foldable area 201b is arranged corresponding to the inner foldable area 10b, and the second non-foldable area 201c is arranged corresponding to the first non-foldable area 10c.

A thickness of the support member 201 is greater than or equal to 0.05 mm and less than or equal to 0.3 mm. A material of the support member 201 includes at least one of stainless steel, structural steel, titanium alloy, copper, copper alloy, aluminum alloy, and magnesium alloy. Specifically, the material of the support member 201 is stainless steel.

Figure 5:
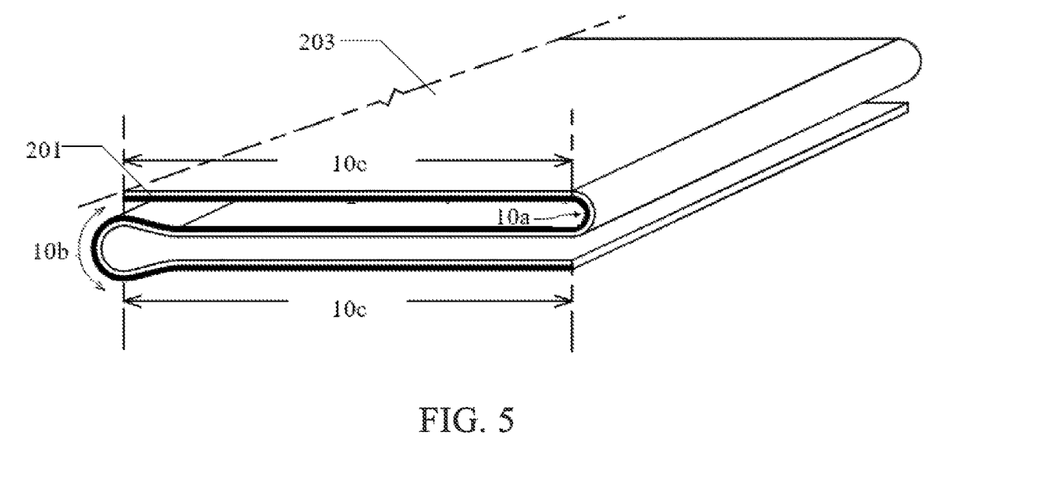
FIG. 5 is a schematic view illustrating a flexible display panel and the support member when the foldable display device shown in FIG. 1 is in the folded state.

As shown in FIG. 5, when the foldable display device 10 is in the Z-shaped folded state, the first foldable area 201a (located corresponding to the outer foldable area 10a) of the support member 201 is subjected to compressive stress, and the second foldable area 201b (located corresponding to the inner folded area 10b) subjected to tensile stress. The first foldable area 201a of the support member 201 and the second foldable area 201b of the support member 201 bear stress in opposite directions.

In view of the problem that the stress in the first foldable area 201a of the support member 201 and the stress in the second foldable area 201b of the support member 201 are in opposite directions, the first foldable area 201a of the support member 201 and the second foldable area 201b of the support member 201 are designed differently, so that the first foldable area 201a of the support member 201 is suitable for compressive stress, while the second foldable area 201b of the support member 201 is suitable for tensile stress.

The following describes a structure of the support member 201 when the foldable display device 10 is in a flat unfolded state, and the support member 201 is in the flat unfolded state.

Figure 6:
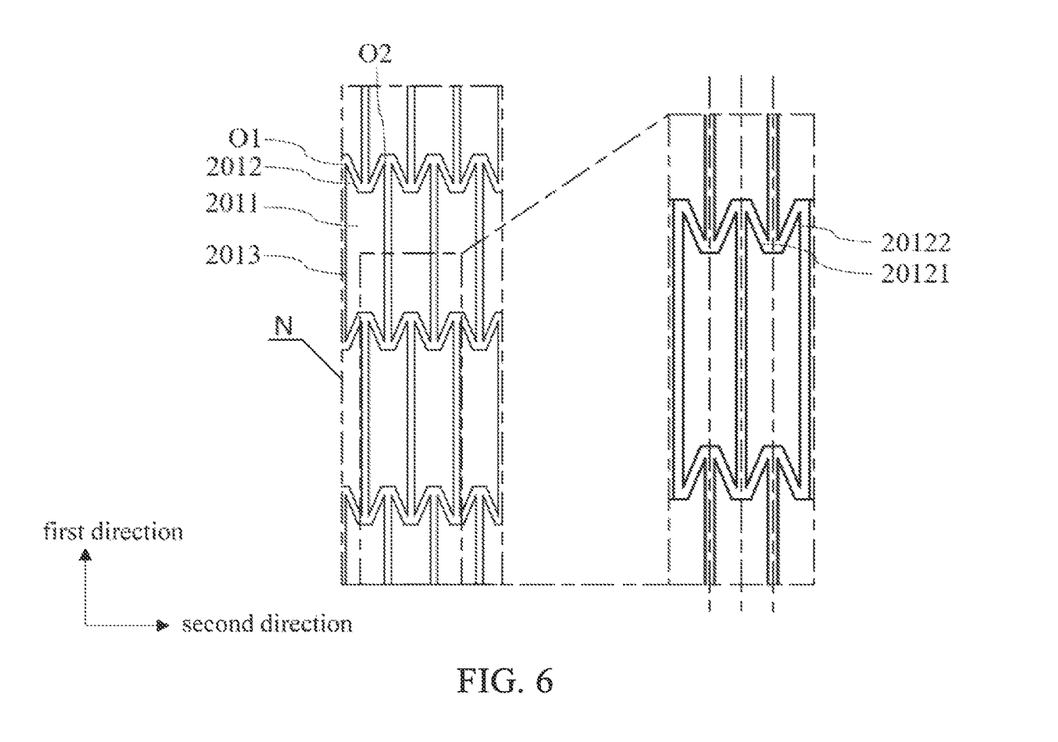
FIG. 6 is a partial enlarged schematic view illustrating a position N of a first foldable area of the support member shown in FIG. 4.
Figure 7:
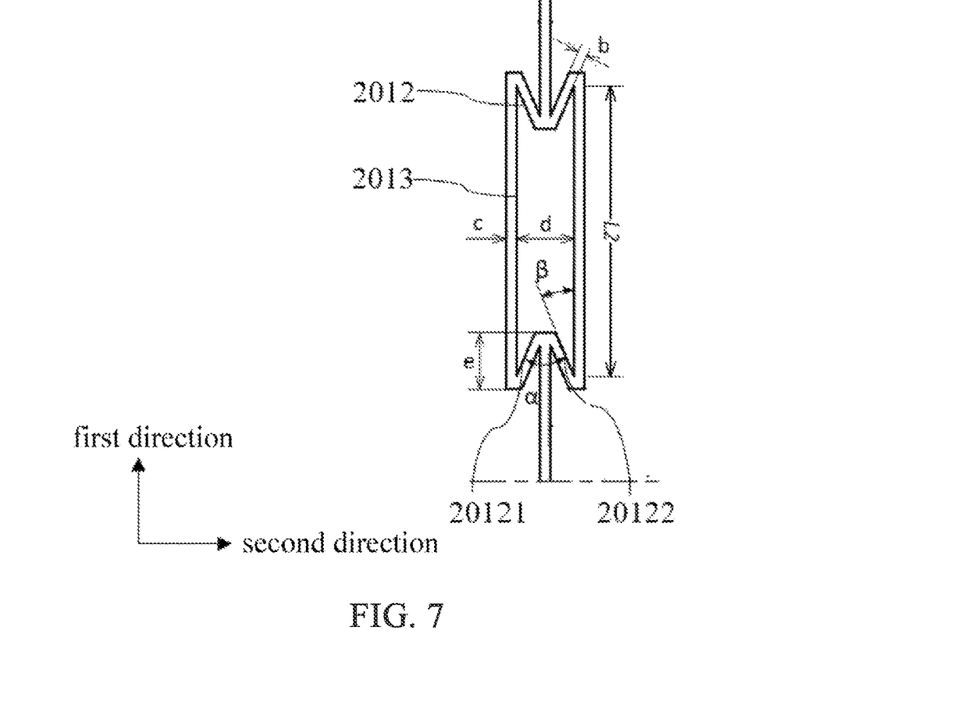
FIG. 7 is a schematic view illustrating a metal pattern in FIG. 6.

As shown in FIGS. 4, 6, and 7, in the first foldable area 201a, the support member 201 includes a plurality of first grooves 2011, and two opposite ends of each of the first grooves 2011 are indented inwardly in a first direction. The first direction intersects a length direction of the support member 201.

When the outer foldable area 10a of the foldable display device 10 is in an outward folded state, the two ends, indented in the first direction, of each of the first grooves 2011 in the first foldable area 201a of the support member 201 are compressed under compressive stress, which preventing a portion of the support member 201 in the first foldable area 201a from having lifting/protruding portions under compressive stress.

The first groove 2011 includes two recessed sections 2012 and two connecting sections 2013. Each of the recessed sections 2012 includes a first O1 and a second end O2 opposite to each other. The first ends O1 of the two recessed sections 2012 are located on a same side, and the second ends O2 of the two recessed sections 2012 are located on a same side. One connecting section 2013 is connected between the first ends O1 of the two recessed sections 2012, and the other connecting section 2013 is connected between the second ends O2 of the two recessed sections 2012.

When the outer foldable area 10a of the foldable display device 10 is in the outward folded state, the compressive stress acts on the first grooves 2011, the two connecting sections 2013 approach each other under the compressive stress, the two recessed sections 2012 are both compressed, and an area of the first groove 2012 is reduced without causing lifting/protruding portions, thereby preventing the portion of the support member 201 in the first foldable area 201a from lifting under the compressive stress.

The two recessed sections 2012 are arranged in mirror symmetry, which is beneficial to ensure that the two recessed sections 2012 are compressed synchronously under the compressive stress. Each recessed section 2012 includes a first recessed section 20121 and a second recessed section 20122. The second recessed section 20122 and the first recessed section 20121 are connected by a horizontal section, the horizontal section is parallel to the length direction of the support member 201, and the second recessed section 20122 and the first recessed section 20121 are mirror-symmetrically arranged, so that the first recessed section 20121 and the second recessed section 20122 of the recessed section 2012 are further close to each other under the compressive stress.

Both the first recessed section 20121 and the second recessed section 20122 are linear, so that the indented end of the first groove 2011 is more easily deformed during a compression process. It can be understood that the first recessed section 20121 and the second recessed section 20122 can also be non-linear. For example, the first recessed section 20121 and the second recessed section 20122 are recessed-arc-shaped, or both the first recessed section 20121 and the second recessed section 20122 are in a shape of a folded line.

A first included angle α between the first recessed section 20121 and the second recessed section 20122 is greater than or equal to 20 degrees and less than or equal to 90 degrees, so that when the first recessed section 20121 and the second recessed section 20122 are close to each other during the compression process of the recessed section 2012 under the compressive stress, there is a suitable angle between the first recessed section 20121 and the second recessed section 20122 to facilitate compression while making the first groove 2011 have a suitable area. Accordingly, by balancing an area and a number of the first grooves 2011 in the first foldable area 201a, the first foldable area 201a of the support member 201 has suitable compressibility. For example, the first included angle α between the first recessed section 20121 and the second recessed section 20122 is 25 degrees, 30 degrees, 35 degrees, 40 degrees, 45 degrees, 50 degrees, 60 degrees, 70 degrees, 75 degrees, or 80 degrees.

The first included angle α between the first recessed section 20121 and the second recessed section 20122 is greater than or equal to 30 degrees and less than or equal to 80 degrees, so as to further ensure the first grooves 2011 in the first foldable area 201a have suitable compressibility.

The connecting sections 2013 are linear and parallel to the first direction. The two connecting sections 2013 of the first groove 2011 are parallel to each other. One connecting section 2013 connects the first recessed sections 20121 of the two recessed sections 2012, and the other connecting sections 2013 connects the second recessed sections 20122 of the two recessed sections 2012, so that the compressive stress is more easily transmitted to the indented ends of the first groove 2011 in the first direction during an outward folding process, thereby making the indented ends of the first groove 2011 in the first direction be able to deform under a small compressive stress. It can be understood that the connecting section 2013 can also be a protruding section, and the protruding section protrudes in a direction away from a middle portion of the first groove 2011 to further increase the compressibility of the first groove 2011.

The two connecting sections 2013 are arranged axisymmetrically so that the two connecting sections 2013 compress the two recessed sections 2012 synchronously. A second included angle between one connecting section 2013 and the first recessed section 20121 is equal to a third included angle θ between the other connecting section 2013 and the second recessed section 20122, so that the first recessed section 20121 and the second recessed section 20122 can approach each other synchronously under the compressive stress.

A third included angle θ between the connecting section 2013 and the second recessed section 20122 is greater than or equal to 15 degrees and less than or equal to 30 degrees, so that the indented ends of the first groove 2011 in the first direction can be compressed and deformed under a smaller external force, and at the same time, it can be ensured that the indented ends of the first groove 2011 in the first direction have suitable compressibility. For example, the third included angle β between the connecting section 2013 and the second recessed section 20122 is 15 degrees, 18 degrees, 20 degrees, 22 degrees, 24 degrees, 26 degrees, or 30 degrees.

It can be known from the above that the first groove 2011 has an axially symmetric indented shape, so that symmetrical portions of the first groove 2011 can deform synchronously during the compression process, while the symmetrical portions of the first groove 2011 receive substantially uniform compressive stress.

The included angle between the first direction and the length direction of the support member 201 is greater than or equal to 30 degrees and less than or equal to 90 degrees, so that when the outer foldable area 10a of the foldable display device 10 is in the outward folded state, the first groove 2011 deforms under the compression stress. For example, the included angle between the first direction and the length direction of the support member 201 is 35 degrees, 40 degrees, 50 degrees, 60 degrees, 70 degrees, 80 degrees, or 90 degrees.

The included angle between the first direction and the length direction of the support member 201 is greater than or equal to 60 degrees and less than or equal to 90 degrees, so that when the outer foldable area 10a of the foldable display device 10 is in the outward folded state, the first groove 2011 can deform under small compressive stress.

Specifically, the included angle between the first direction and the length direction of the support member 201 is equal to 90 degrees, that is, the first direction is perpendicular to the length direction of the support member 201, so that when the outer foldable area 10a of the foldable display device 10 is in the outward folded state, the first groove 2011 can deform under even smaller compressive stress.

A first dimension L2 of the first groove 2011 along the first direction is greater than or equal to a second dimension d of the first groove 2011 along the length direction of the support member 201. In this way, multiple first grooves 2011 can be provided in the length direction of the support member 201 to ensure the compressibility of the first foldable area 201a of the support member 201 when folded outward.

A ratio of the first dimension L2 of the first groove 2011 in the first direction to the second dimension d of the first groove 2011 in the length direction of the support member 201 is greater than or equal to 1 and less than or equal to 4. That is to say, the dimension of the first groove 2011 in the first direction is greater than or equal to the dimension in the length direction of the support member 201. For example, the ratio is 1, 1.2, 1.5, 1.8, 2, 2.2, 2.5, 2.8, 3, 3.2, 3.4, 3.6, or 4.

Specifically, the first dimension L2 of the first groove 2011 along the first direction is greater than or equal to 3 mm and less than or equal to 10 mm, and the second dimension d of the first groove 2011 along the length direction of the support member 201 is greater than or equal to 2 mm and less than or equal to 4 mm. For example, the first dimension L2 of the first groove 2011 along the first direction is 3 mm, 4 mm, 5 mm, 6 mm, 7 mm, 8 mm, and 10 mm; and the second dimension d of the first groove 2011 along the length direction of the support member 201 is 2 mm, 2.5 mm, 3 mm, and 4 mm.

The first grooves 2011 include a plurality of rows of the first grooves 2011 arranged in the first direction, and one row of the first grooves 2011 includes multiple first grooves 2011 arranged side by side along the length direction of the support member 201.

A first distance c between two adjacent first grooves 2011 in one row of the first grooves 2011 is smaller than the second dimension d of the first groove 2011 in the length direction of the support member 201.

A ratio of the second dimension d of the first groove 2011 in the length direction of the support member 201 to the first distance c between two adjacent first grooves 2011 in one row of the first grooves 2011 is greater than or equal to 3 and less than or equal to 20. For example, the ratio is 4, 5, 6, 7, 8, 9, 10, 11, 12, 13, 14, 15, 16, 17, 18, or 20.

Each two adjacent first grooves 2011 between two adjacent rows of the first grooves 2011 are staggered with respect to each other, so that the compressive stress is more easily transmitted among the first grooves 2011 in the first foldable area 201a. It can be understood that, two adjacent first grooves 2011 between two adjacent rows of the first grooves 2011 can also be arranged side by side and one-to-one in the first direction.

A second distance b between two adjacent first grooves 2011 in two adjacent rows of the first grooves 2011 is equal to the first distance c between two adjacent first grooves 2011 in one row of the first grooves 2011, thereby ensuring that every portion of the first grooves 2011 receives the same stress under the compressive stress.

Specifically, the first distance c between two adjacent first grooves 2011 in one row of first grooves 2011 is greater than or equal to 0.2 mm and less than or equal to 0.6 mm. For example, the first distance c between two adjacent first grooves 2011 in one row of the first grooves 2011 is 0.2 mm, 0.3 mm, 0.4 mm, 0.5 mm, or 0.6 mm.

A portion between two adjacent first grooves 2011 in one row of the first grooves 2011 is connected to a middle position of the recessed section of one first groove 2011 in one adjacent row of the first grooves 2011. That is to say, the portion between two adjacent first grooves 2011 in one row of the first grooves 2011 is connected to a connected portion between the first recessed section 20121 and the second recessed section 20122 of the first recessed section 2012 of one first groove 2011 in another row of the first grooves 2011. This way, the portion between two adjacent first grooves 2011 in one row of the first grooves 2011 can suppress, in an adjacent position, the compression deformation of the first groove 2011 in the adjacent row of the first grooves 2011. Accordingly, the compression deformation of the first grooves 2011 is more controllable.

A vertical distance e in the first direction between two opposite ends of the portion between two adjacent first grooves 2011 in two adjacent rows of the first grooves 2011 is greater than or equal to 1.5 mm and less than or equal to 3 mm, so that a length of the portion between two adjacent first grooves 2011 in two adjacent rows of the first grooves 2011 is appropriate, thereby ensuring the compressibility of the first grooves 2011.

A depth of the at least one first groove 2011 in a thickness direction of the support member 201 is less than a thickness of the support member 201, and/or the depth of the at least one first groove 2011 in the thickness direction of the support member 201 is equal to the thickness of the support member 201, so that the first groove 2011 can deform under the stress.

Specifically, the depth of each of the first grooves 2011 in the thickness direction of the support member 201 is equal to the thickness of the support member 201, so that the compressibility of the first foldable area 201*a* of the support member 201 in the outward folded state is increased.

It can be understood that, in the first foldable area 201*a*, the depth of each of the first grooves 2011 can also be less than the thickness of the support member 201; or alternatively, in the first foldable area 201*a*, the depth of a portion of the first grooves 2011 is less than the thickness of the support member 201, and the depth of a portion of the first groove 2011 is equal to the thickness of the support member 201.

In the present embodiment, the first grooves 2011 are defined in the first foldable area 201*a* of the support member 201. The first grooves 2011 have mechanical properties of negative Poisson's ratios. When the outer foldable area 10*a* of the foldable display device 10 is in a folded state, the distance between the two connecting sections 2013 of the first groove 2011 in the first foldable area 201*a* of the supporting member 201 is reduced under the compressive stress, the two recessed sections 2012 are compressed, and the first grooves 2011 are easy to compress to adapt to the compressive stress environment, thus preventing lifting/protruding of the support member 201 in the first foldable area 201*a* under the compressive stress, and preventing an adhesive layer of the flexible module from peeling off and detached, which leads to problems like black spots or bright lines on a screen. Moreover, the first foldable area 201*a* of the supporting member 201 is more easily compressed and deformed, so that the first foldable area 201*a* of the support member 201 adapts to the compressive stress environment resulting from the outward folding of the foldable display device, so that the support member 201 applies less squeezing/pressing force to the first adhesive layer 2061, which improves the problem of black spots or bright lines on the screen caused by detachment of the first adhesive layer 2061.

Figure 8:
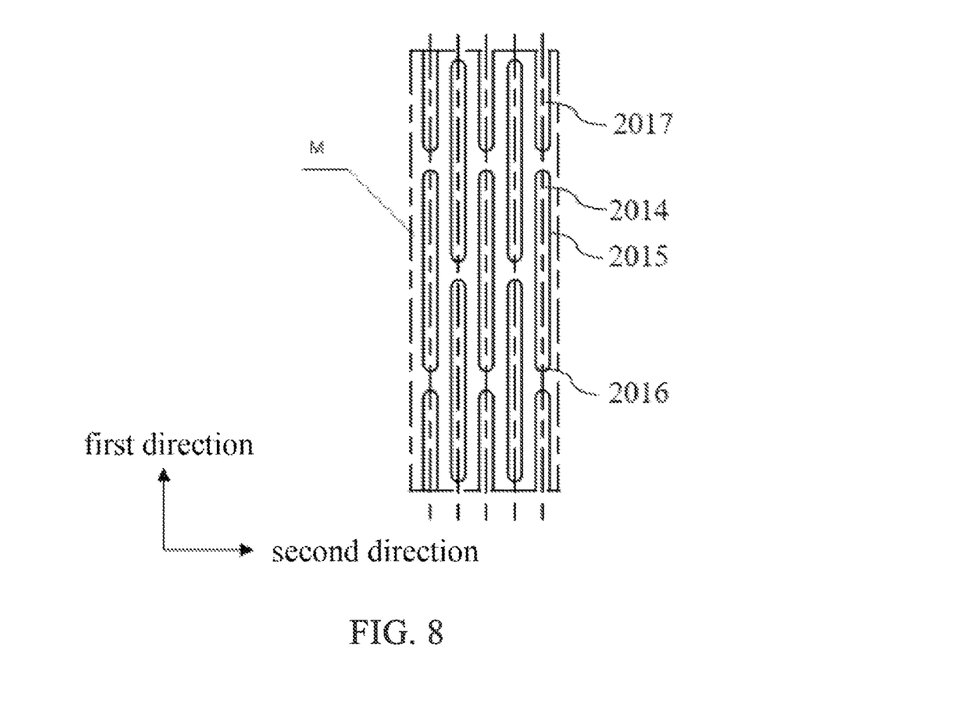
FIG. 8 is a partially enlarged view illustrating a position M of a second foldable area of the support member shown in FIG. 4.
Figure 9:
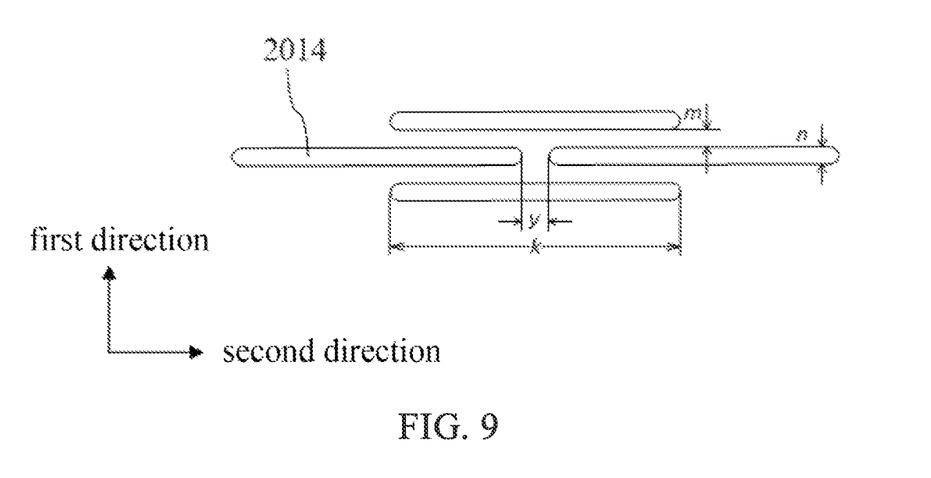
FIG. 9 is a partial enlarged view of the second foldable area of the support member shown in FIG. 8.

FIGS. 4, 8, and 9, in the second foldable area 201*b*, the support member 201 further includes a plurality of second grooves 2014, each second groove 2014 is elongated in shape, and a length of the second groove 2014 is parallel to the first direction.

When the inner foldable area 10*b* of the foldable display device 10 is in an inward folded state, the second grooves 2014 are stretched under tensile stress, and an area of the second grooves 2014 increases.

Two opposite ends of the second groove 2014 in the first direction protrude outward. The two protruding opposite ends of the second groove 2014 in the first direction include at least one of a circular arc shape or an elliptical arc shape.

Specifically, the second groove 2014 includes two straight sections 2015 opposite to each other and a plurality of arc sections 2016 connecting the two straight sections 2015. The straight sections 2015 are parallel to the first direction, and the arc sections 2016 are located in the second groove 2014 in the first direction and protrude outward. The arc section 2016 is circular-arc-shaped. It can be understood that the arc section 2016 can also be elliptical-arc-shaped.

The second grooves 2014 include a plurality of columns of the second grooves 2014 arranged along the length direction of the support member 201, the distance between any two adjacent columns of the second grooves 2014 is equal, and adjacent two second grooves 2014 between two adjacent rows of the second grooves 2014 are staggered. Each column of the second grooves 2014 includes multiple second grooves 2014 arranged side by side along the first direction.

A third distance y between two adjacent second grooves 2014 in one row of the second grooves 2014 is greater than a fourth distance m between two adjacent columns of the second grooves 2014.

Specifically, when a folding radius of the inner foldable area 10*b* of the foldable display device 10 is greater than or equal to 4 mm and less than or equal to 6 mm, a third dimension k of one second groove 2014 in the first direction is greater than or equal to 4 mm and less than or equal to 7 mm, and a fourth dimension n of one second groove 2014 in the second direction is greater than or equal to 0.15 mm and less than or equal to 0.3 mm.

The third distance y between two adjacent second grooves 2014 in one column of the second grooves 2014 is greater than or equal to 0.2 mm and less than or equal to 0.6 mm. The fourth distance m between two adjacent columns of the second grooves 2014 is greater than or equal to 0.1 mm and less than or equal to 0.25 mm.

An area ratio of the second grooves 2014 in the second foldable area 201*b* is smaller than an area ratio of the first grooves 2011 in the first foldable area 201*a*, so that flexibility of the second foldable area 201*b* of the support member 201 is less than flexibility of the first foldable area 201*a*, thus ensuring that the first foldable area 201*a* of the support member 201 is more easily deformed.

The depth of each of the second grooves 2014 in the thickness direction of the support member 201 is less than or equal to the thickness of the support member 201. Specifically, the depth of each of the second grooves 2014 in the thickness direction of the support member 201 is equal to the thickness of the support member 201.

It can be understood that the depth of each of the second grooves 2014 in the thickness direction of the support member 201 is less than the thickness of the support member 201; or alternatively, the depth of a portion of the second grooves 2014 in the thickness direction of the support member 201 is less than the thickness of the support member 201, and the depth of a portion of the second grooves 2014 in the thickness direction of the support member 201 is equal to the thickness of the support member 201.

In the second foldable area 201b, the support member 201 further includes a plurality of third grooves 2017, and the third grooves 2017 are U-shaped. The third grooves 2017 are defined at two opposite edges of the second foldable area 201b of the support member 201 in the first direction 201b, each third groove 2017 is arranged side by side with one column of the second grooves 2014, and an opening direction of the third groove 2017 faces away from the second grooves 2014.

A depth of each of the third grooves 2017 in the thickness direction of the support member 201 is less than or equal to the thickness of the support member 201. Specifically, the depth of each of the third grooves 2017 in the thickness direction of the support member 201 is equal to the thickness of the support member 201.

It can be understood that the depth of each of the third grooves 2017 in the thickness direction of the support member 201 can be less than the thickness of the support member 201; or alternatively, the depth of a portion of the third grooves 2017 in the thickness direction of the support member 201 is equal to the thickness of the support member 201.

In the present embodiment, the design of the second grooves 2014 and the third grooves 2017 in the second foldable area 201b of the support member 201 can adapt to the tensile stress environment generated by the inward folding, so that the second foldable area 201b of the support member more coordinates with deformation of adjacent adhesive layer and film layers, which reduces a stress difference during the folding process of the flexible display module, thereby ensuring a bending fatigue life of a module material in the inner foldable area 10b.

The above embodiments are only used for ease of understanding the technical solutions of the present application and its main ideas. Those of ordinary skill in the art should understand that the technical solutions described in the foregoing embodiments can be modified, or some of the technical solutions can be equivalently replaced. Such modifications or replacements do not make the essence of the corresponding technical solutions deviate from the scope of the technical solutions of the embodiments of the present application.

What is claimed is:

1. A support member for a foldable display device, wherein the support member comprises a first foldable area, and when the support member is in a flat unfolded state, the support member comprises:
a plurality of first grooves defined in the first foldable area, wherein two opposite ends of each of the first grooves along a first direction are indented inwardly toward a center of the first groove along the first direction, wherein each first groove exhibits an axially symmetric indented shape, with each first groove being the same in size and shape, and the first direction intersects a length direction of the support member,
wherein each of the first grooves comprises:
two recessed sections disposed opposite to each other in the first direction, wherein each of the recessed sections comprises a first end and a second end opposite to each other; and
two connecting sections, wherein one connecting section is connected between the first ends of the two recessed sections, and the other connecting section is connected between the second ends of the two recessed sections, wherein each of the recessed sections comprises:
a first recessed section; and
a second recessed section directly connected to the first recessed section, wherein the second recessed section and the first recessed section are symmetrically arranged with respect to each other.

2. The support member according to claim 1, wherein the first recessed section and the second recessed section are both linear-shaped.

3. The support member according to claim 2, wherein an included angle between the first recessed section and the second recessed section is greater than or equal to 20 degrees and less than or equal to 90 degrees.

4. The support member according to claim 2, wherein in each of the first grooves, the connecting sections are linear-shaped and parallel to the first direction, one of the connecting sections is connected to the first recessed sections of the two recessed sections, and the other one of the connecting sections is connected to the second recessed section of the two recessed sections.

5. The support member according to claim 4, wherein in each of the first grooves, an included angle between one of the connecting sections and any first recessed section, and an included angle between the other one of the connecting sections and any second recessed section are both greater than or equal to 15 degrees and less than or equal to 30 degrees.

6. The support member according to claim 1, wherein in each of the first grooves, the two recessed sections are arranged symmetrically with respect to each other, and the two connecting sections are arranged axially symmetrically with respect to each other.

7. The support member according to claim 1, wherein an included angle between the first direction and the length direction of the support member is greater than or equal to 30 degrees and less than or equal to 90 degrees.

8. The support member according to claim 7, wherein the included angle between the first direction and the length direction of the support member is equal to 90 degrees.

9. The support member according to claim 1, wherein a dimension of the first groove in the first direction is greater than or equal to a dimension of the first groove in the length direction of the support member.

10. The support member according to claim 1, wherein the first grooves comprise a plurality of rows of the first grooves arranged in the first direction, and one row of the first grooves comprises multiple first grooves arranged side by side along the length direction of the support member.

11. The support member according to claim 10, wherein a distance between two adjacent first grooves in one row of the first grooves is smaller than a dimension of each of the first grooves in the length direction of the support member.

12. The support member according to claim 10, wherein each two adjacent first grooves between two adjacent rows of the first grooves are staggered with respect to each other, and wherein a portion between adjacent two first grooves in one of the two adjacent rows of the first grooves is connected to a middle of the recessed section of one of the first grooves in the other one of the two adjacent rows of the first grooves.

13. The support member according to claim 10, wherein a distance between two adjacent first grooves between two adjacent rows of the first grooves is equal to a distance between two adjacent first grooves in one row of the first grooves.

14. The support member according to claim 1, wherein a depth of at least one of the first grooves in a thickness direction of the support member is less than a thickness of the support member.

15. The support member according to claim 1, wherein a depth of each of the first grooves in a thickness direction of the support member is equal to a thickness of the support member.

16. The support member according to claim 1, wherein the support member further comprises a second foldable area spaced apart from the first foldable area, the first foldable area is arranged corresponding to an outer foldable area of the foldable display device, and the second foldable area is arranged corresponding to an inner foldable area of the foldable display device, wherein when the support member is in a flat unfolded state, the support member further comprises:
a plurality of second grooves defined in the second foldable area, and the second grooves are elongated-shaped, wherein a length direction of each of the second grooves is parallel to the first direction, two opposite ends of each of the second grooves protrude outward in the first direction, and the two protruding opposite ends of the second grooves in the first direction comprise at least one of a circular arc shape or an elliptical arc shape,
wherein an area ratio of the second grooves in the second foldable area is smaller than an area ratio of the first grooves in the first foldable area.

17. The support member according to claim 16, wherein the first direction is perpendicular to the length direction of the support member, the second grooves comprise a plurality of columns of the second grooves arranged along the length direction of the support member, each column of the second grooves comprise multiple second grooves arranged side by side along the first direction, and two adjacent second grooves between two adjacent columns of the second grooves are staggered with respect to each other.

18. A foldable display device, comprising a support member for a foldable display device, the support member comprising a first foldable area, wherein when the support member is in a flat unfolded state, and the foldable display device comprises:
a flexible display panel; and
the support member comprising:
a plurality of first grooves defined in the first foldable area, wherein two opposite ends of each of the first grooves along a first direction are indented inwardly toward a center of the first groove along the first direction, wherein each first groove exhibits an axially symmetric indented shape, with each first groove being the same in size and shape, the first direction intersects a length direction of the support member, and the support member is disposed on a back of a light-emitting surface of the flexible display panel,
wherein each of the first grooves comprises:
two recessed sections disposed opposite to each other in the first direction, wherein each of the recessed sections comprises a first end and a second end opposite to each other; and
two connecting sections, wherein one connecting section is connected between the first ends of the two recessed sections, and the other connecting section is connected between the second ends of the two recessed sections,
wherein each of the recessed sections comprises:
a first recessed section; and
a second recessed section directly connected to the first recessed section, wherein the second recessed section and the first recessed section are symmetrically arranged with respect to each other.

19. A support member for a foldable display device, wherein the support member comprises a first foldable area, and when the support member is in a flat unfolded state, the support member comprises:
a plurality of first grooves defined in the first foldable area, wherein two opposite ends of each of the first grooves along a first direction are indented inwardly toward a center of the first groove along the first direction, wherein each first groove exhibits an axially symmetric indented shape, with each first groove being the same in size and shape, and the first direction intersects a length direction of the support member,
wherein each of the first grooves comprises:
two recessed sections disposed opposite to each other in the first direction, wherein each of the recessed sections comprises a first end and a second end opposite to each other; and
two connecting sections, wherein one connecting section is connected between the first ends of the two recessed sections, and the other connecting section is connected between the second ends of the two recessed sections
wherein each of the recessed sections comprises:
a first recessed section; and
a second recessed section directly connected to the first recessed section, wherein the second recessed section and the first recessed section are symmetrically arranged with respect to each other, wherein the first recessed section and the second recessed section are both linear-shaped.

20. The support member according to claim 2, wherein in each of the first grooves, the connecting sections are linear-shaped and parallel to the first direction, one of the connecting sections is connected to the first recessed sections of the two recessed sections, and the other one of the connecting sections is connected to the second recessed section of the two recessed sections.

* * * * *